Figure 1:
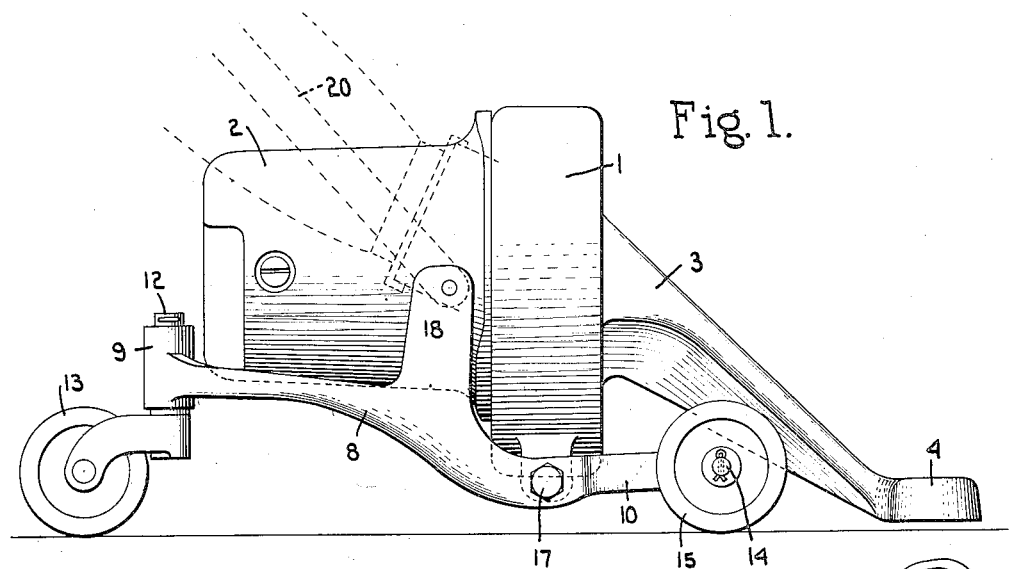

Sept. 2, 1924.
W. V. ORR
SUCTION CLEANER
Filed May 26, 1921      4 Sheets-Sheet 1

1,507,417

INVENTOR.
William V. Orr
BY
*Harold Ellis Smith*
ATTORNEY.

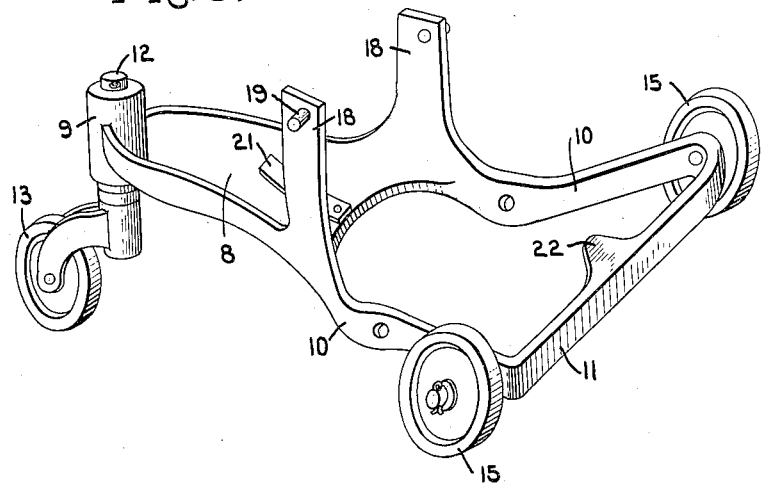
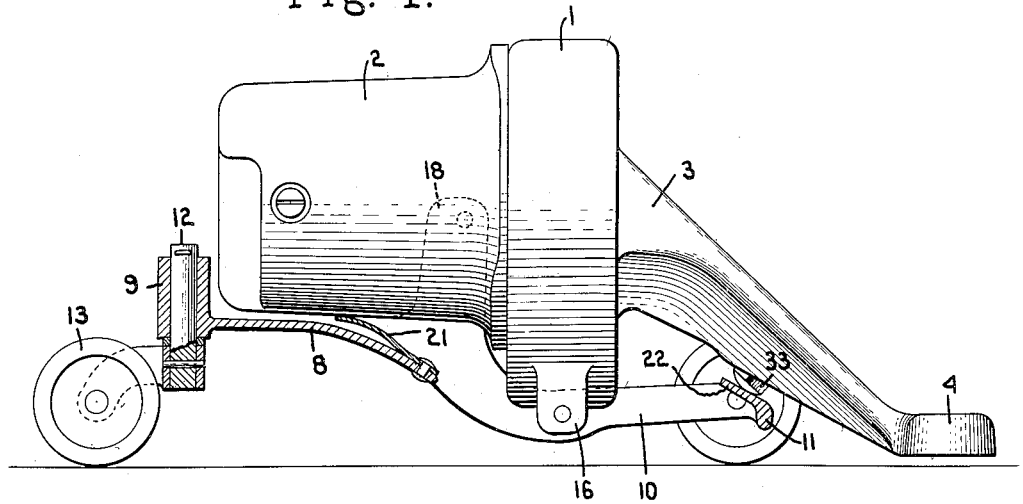

Sept. 2, 1924.

W. V. ORR

SUCTION CLEANER

Filed May 26, 1921

1,507,417

4 Sheets-Sheet 3

INVENTOR.
William V. Orr
BY
ATTORNEY.

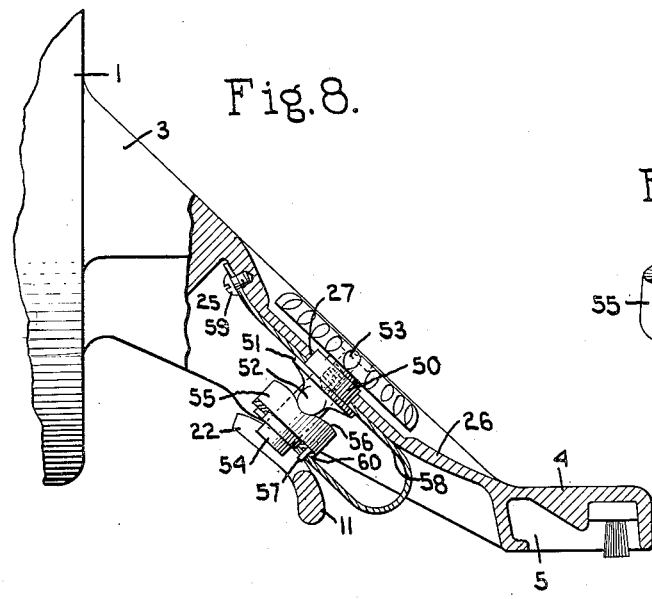
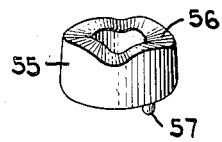
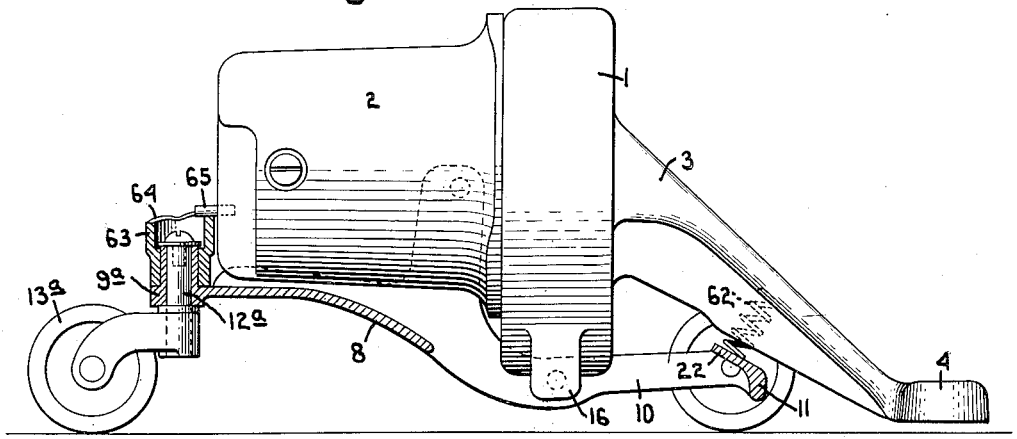

Patented Sept. 2, 1924.

1,507,417

UNITED STATES PATENT OFFICE.

WILLIAM V. ORR, OF CLEVELAND, OHIO.

SUCTION CLEANER.

Application filed May 26, 1921. Serial No. 472,831.

*To all whom it may concern:*

Be it known that I, WILLIAM V. ORR, a citizen of the United States, residing at Cleveland, in the county of Cuyahoga and State of Ohio, have invented a certain new and useful Improvement in Suction Cleaners, of which the following is a full, clear, and exact description, reference being had to the accompanying drawings.

This invention relates to suction cleaners and has for its main objects the provision of new and improved means for supporting the same upon the working surface, for adjusting the height of the nozzle, and for overcoming accidental irregularities in the shape and size of the parts encountered in the process of manufacture. Other objects and advantages will become apparent as the description proceeds. Devices of this character are generally made largely of cast aluminum because of its beauty, lightness, and strength, but this material offers the practical disadvantages of possessing a high degree of shrinkage and warping and also of being somewhat difficult to work. This warping and shrinkage renders it difficult to produce jigs which will serve accurately for any large number of operations and also renders it uncertain whether the device so produced will bear the proper relation to the working surface. It therefore becomes desirable to dispense with manufacturing operations on the casing so far as possible, and I have found it to be advantageous to support the cleaner upon a separate frame or chassis to which the wheels, and also preferably the handle, are attached, this frame being attached to the casing in a way which entails a minimum of machine work on the casing, which enables factory adjustment to compensate for variations in the castings or in their machining, and also enables operating adjustment in accordance with the condition of the surface to be cleaned.

In the drawings accompanying and forming a part of this application I have shown certain illustrative embodiments of my invention but without intent to limit myself to the features of construction and arrangement therein shown excepting as the same are specifically recited in my claims.

Figure 2:
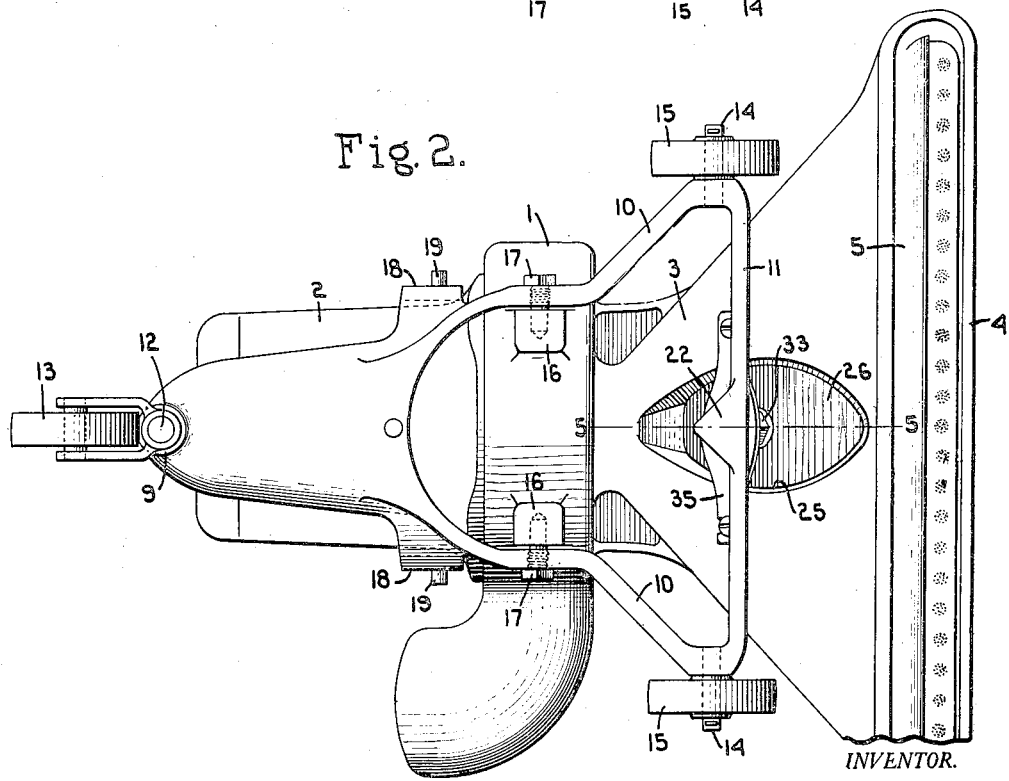
Figure 5:
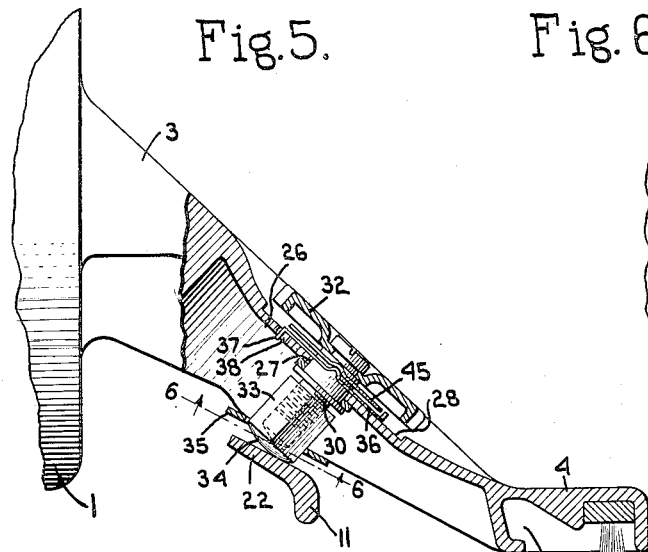
Figure 6:
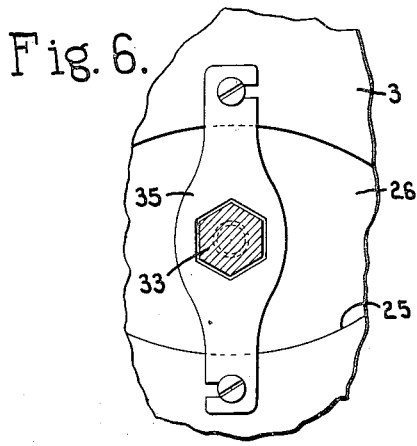
Figure 7:
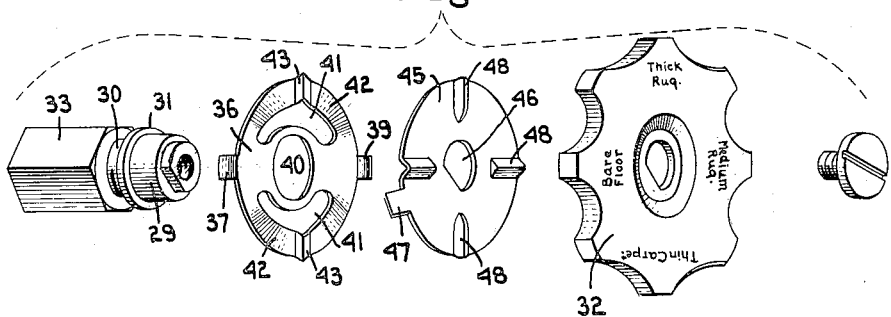

Fig. 1 is a side elevation of a simple type of cleaner embodying my improvements; Fig. 2 is a bottom plan view of the same; Fig. 3 is a perspective view of the frame or chassis; Fig. 4 is a view similar to Fig. 1 showing the casing in elevation and the chassis or frame in longitudinal section; Fig. 5 is an enlarged detail view corresponding to the line 5—5 of Fig. 2; Fig. 6 is a sectional view on the line 6—6 of Fig. 5; Fig. 7 is a separated perspective view of the adjustment device illustrated in Figs. 5 and 6; Fig. 8 is a view similar to Fig. 5 showing a different type adjustment device; Fig. 9 is a perspective view of the cam member illustrated in Fig. 8; and Fig. 10 illustrates another modified structure embodying my inventive ideas.

Describing the parts by reference characters, 1 represents the fan chamber of a suction cleaner having rigidly secured to one end the motor housing 2 and having projecting from the other end the collecting nozzle 3 which terminates in a laterally elongated working portion 4 in which is formed a downwardly facing inlet mouth 5 closely applied to the working surface. This fan chamber, motor housing, and nozzle constitute a rigid structure and comprise the cleaner casing, and in the present embodiment the plane of the inlet mouth is parallel to the common axis of the fan chamber and motor, which axis is maintained at all times in substantially horizontal position by the means now to be described, although I do not restrict myself to this horizontal arrangement except as specifically claimed.

According to my invention this casing, whatever be the arrangement of its members is supported upon a frame or chassis to which the wheels are journaled and also preferably the handle. This frame or chassis comprises a body portion 8 having at its rearward end the upright socket 9 and having at its forward part the spaced side-arms 10—10 whose extremities are connected by the cross bar 11. Journaled in the socket 9 is the upright shank 12 of a caster 13, and carried by the forward ends of the arms 10 are laterally projecting gudgeons 14 upon which are journaled the carrying wheels 15—15. The bottom of the fan chamber is formed with a pair of integral bosses 16—16 for the reception of pivot-screws 17—17 screwed into the sides 10—10 of the frame. The sides of the frame are also provided with upwardly extending arms 18 which embrace the sides of the motor housing 2 and are formed at their upper ends with studs 19 on which are pivoted the arms 20 of the handle fork. As the result of this construction the amount of machining which must be done in the casing itself, is very small.

In order to maintain this casing with the inlet mouth spaced the right distance above the floor I provide an upwardly acting spring interposed between the casing and chassis at one side of the pivot axis, and a movable adjusting member interposed between such members at the opposite side of the pivot axis. In the arrangement illustrated in Figs. 1 to 9 inclusive the spring is located at the rear of the pivot as is shown at 21, while the adjusting member is carried by the nozzle 3 and bears upon an enlargement 22 carried by the cross bar 11 of the frame. Fig. 10 illustrates a reversal of this arrangement. This adjusting device is preferably one possessing the double function of compensating for variation in the parts due to warping or shrinkage of the castings or errors in machining and also of enabling adjustment in the height of the cleaner depending upon the nature of the surface to be cleaned thereby.

In the arrangement illustrated in Figs. 2 to 7 inclusive, the nozzle is formed with two branched passageways defining between them a downwardly opening recess 25 bridged by a web 26 in which is formed an aperture 27 surrounded on the upper side by a flat seat 28. Rotatably mounted in this aperture is the shank 29 of a screw 30, provided beneath the web with a flange 31 and above the web with a removable hand-wheel 32 preferably marked on its face with indications showing the proper adjustment, such as "Thick rug", "Medium rug", "Thin carpet", "Bare floor". Mounted upon the threaded portion of the screw is a prismatic nut 33 having a rounded end 34 engaging the enlargement 22, rotation of this nut being prevented by the yoke 35 detachably secured to the lower face of the nozzle and slidably engaging the nut.

In order to hold this hand-wheel within the proper range of movement and also to hold it properly at the several indicated positions of its adjustment I preferably employ the construction shown in Figs. 5 and 7. To this end I have provided two washers, one fixed to the casing and the other rotatable with the screw. The first comprises a circular, spring-metal, disc 36 having at one point a downturned finger 37 adapted to enter a hole 38 in the web and having at another point an upturned finger 39. The center of the disc is formed with an aperture 40 loosely receiving the shank 29, and between this aperture and the edge of the disc I have shown two oppositely-disposed, arcuate slots 41—41 which define comparatively narrow rims 42—42 each of which is pressed to produce a tooth 43. The other washer comprises a circular disc 45 having a central aperture 46 nonrotatably mounted upon the shank 29 and having at its margin a finger 47 adapted to engage the finger 39 and thereby confine the parts to a single revolution. The periphery of the disc 45 is also formed with a plurality of spaced recesses 48 adapted to receive the teeth 43 as illustrated in Fig. 5 and hold the parts impositively at the different stations. The rims 42 are displaced away from the plane of the disc 36 sufficiently to allow the springing movement necessary to enable relative movement between the two washers.

With this arrangement the nut 33 is applied to the screw 30 and held in such position as to compensate for variations in the castings and support the inlet mouth at approximately the proper height above the floor. The pitch of the thread is so chosen that a single turn of the screw will raise and lower the nozzle a sufficient amount to compensate for variations in different floor coverings.

In Figs. 8 and 9 I have shown another adjusting device. The cleaner as before is formed with a recess 25 in the nozzle traversed by a web 26 having therein an aperture 27, and rotatably mounted in this aperture is a shank 50 having beneath the web the flange 51 provided with the finger 52 and having removably secured above the web the hand-wheel 53. This shank continues beyond the finger 52 in the form of a spindle 54 on which is rotatably mounted the cam-block 55, one end of which is provided with a plurality of inclined faces 56 co-operating with the finger 52 and the other end of which is formed with the stud 57. This shank and cam-block are embraced by a U-shaped spring 58, by means of which the parts are pressed yieldingly together. The stud 57 enters a slot or recess in the spring so as to prevent rotation of the cam-block. One end of this spring is secured on the web 26 as by means of the screw 59, while the other end rests upon the enlargement 22, said enlargement in the present instance being slotted so that the spindle 54 can project freely therethrough. As the wheel 53 is rotated the distance between the two arms of the spring is varied, raising and lowering the nozzle accordingly. Initial variations in the shape and size of the parts are compensated by interposing a greater or smaller number of washers at the point 60. In the embodiment shown in Fig. 10 a spring 62 carried by the nozzle presses upon the enlargement 22 of the cross-bar 11, and at the opposite end of the chassis the exterior of the socket 9ª is reduced in size and rendered cylindrical for the reception of the hollow cam member 63 whose upper end is formed with inclined surfaces 64 cooperating with a rigid pin 65 carried by the motor housing, thus enabling the entire casing to be rocked about its pivot to raise and lower the nozzle. In this case the tension of the spring 62 must be sufficiently great to sustain both the weight of the parts and the suction of the nozzle.

Another advantage of this chassis arrangement is that the shank of the caster is always vertical thus enabling free swivel movement and assuring the same relation between the floor and nozzle both on the front stroke and on the back stroke, which is not true in cases where the shank is inclined, and such inclination always occurs when vertical adjustment is effected between the different wheels.

It will be understood that not only the specific forms herein illustrated but many others are embraced within my inventive idea, wherefore I limit myself only as specifically recited in the annexed claims.

Having thus described my invention what I claim is:

1. In a suction cleaner, in combination, a rigid frame, floor engaging means whereby said frame is supported in stable equilibrium, a cleaner casing pivotally mounted upon said frame on a substantially horizontal axis, said casing having a fan chamber and motor rigidly connected together and also a nozzle which projects beyond the frame and is provided with a downwardly facing inlet mouth, and means for adjustably securing said casing in different positions about its pivot whereby the distance of said inlet mouth from the floor is adjusted.

2. In a suction cleaner, in combination, a rigid frame of approximately triangular shape, carrying wheels journaled near the corners thereof, a cleaner casing comprising a motor-chamber, fan-chamber, and collecting nozzle, arranged in the order named and constituting a rigid structure pivoted to said frame upon a substantially horizontal axis which is transverse to the common axis of the fan and motor, said nozzle having a narrow, elongated, inlet mouth located beyond and parallel to one side of said frame, and means including a rotatable wedging member on one side of the pivot axis and a spring device on the opposite side of said pivot axis for adjusting the height of said nozzle above the floor.

3. In a suction cleaner, the combination, with a casing comprising a motor-chamber, fan-chamber, and collecting-nozzle, arranged in the order named and constituting a rigid structure, of a rigid frame pivotally connected thereto upon an axis which is transverse to the axis of such fan-chamber and motor-chamber, wheels carried by said frame adapted and arranged to support said frame and casing in stable equilibrium upon a horizontal surface, and pressure-exerting means interposed between said frame and casing at each side of said axis, one of said means comprising a spring and the other comprising a rotatable wedging member which is operable from the top of the cleaner.

4. In a suction cleaner, the combination with a casing comprising a motor-chamber, fan-chamber, and collecting-nozzle, arranged in the order named and constituting a rigid structure, of a rigid frame secured beneath the same and having an arm at each side which extends upwardly by said casing, a forked handle pivoted to said arms, and wheels journaled to said frame adapted and arranged to support said frame and casing in stable equilibrium upon a horizontal surface.

5. In a suction cleaner, the combination with a casing comprising a motor-chamber, fan-chamber, and collecting nozzle, arranged in the order named and constituting a rigid structure of a rigid frame pivoted beneath said casing upon a transverse axis intermediate the ends of both the frame and casing, said frame being approximately triangular in shape and arranged with one of its side members traversing said casing underneath said nozzle, wheels journaled at the corners of said frame in supporting relation to said frame and casing, means interposed between said nozzle and the frame member therebeneath operative to raise said nozzle, and means interposed between said motor casing and the part of the frame adjacent thereto, one of such means being a spring and the other means being a camming member.

6. In a suction cleaner, the combination with a casing comprising a motor-chamber, fan-chamber, and collecting nozzle, arranged in the order named and constituting a rigid structure, of a rigid frame pivoted beneath said casing upon a transverse axis intermediate the ends of both the frame and casing, said frame being approximately triangular in shape and arranged with one of its side members traversing said casing underneath said nozzle, wheels journaled at the corners of said frame in supporting relation to said frame and casing, said nozzle having an aperture therethrough, and an adjusting member located in said aperture and bearing against said frame-member and adapted to vary the distance between said nozzle and member.

7. In a suction cleaner, the combination with a casing comprising a motor-chamber, fan-chamber, and collecting nozzle, arranged in the order named and constituting a rigid structure, of a rigid frame pivoted beneath said casing upon a transverse axis intermediate the ends of both the frame and casing, said frame being approximately triangular in shape and arranged with one of its side members traversing said casing underneath said nozzle, wheels journaled at the corners of said frame in supporting relation to said frame and casing, said nozzle having an aperture therethrough, and a two part adjusting member located in said aperture and bearing against said frame member, means for varying the location of one of said parts relative to the member against which it rests to compensate for manufacturing-inequalities, and means for varying the location of said parts relatively to each other according to the nature of the surface to be cleaned.

8. Adjusting mechanism comprising, in combination, a support having a hole therein and a surfaced portion surrounding the same, a shank rotatably mounted in said hole, a member carried by said shank and overlying said surfaced portion, and a pair of washers interposed between said member and portion, one of said washers being rotatable with said shank and the other being fixed to said portion, one of said washers having a portion displaced from its plane so as to be resilient, and said washers having spaced interfitting portions adapted to snap into each other as the shank is rotated.

In testimony whereof, I hereunto affix my signature.

WILLIAM V. ORR.